United States Patent [19]

Benjamin et al.

[11] Patent Number: 4,847,104
[45] Date of Patent: Jul. 11, 1989

[54] FROZEN DOUGH HAVING IMPROVED FROZEN STORAGE SHELF LIFE

[75] Inventors: Earl J. Benjamin, New Rochelle, N.Y.; Charles H. Ke, Plainsboro; Richard B. Hynson, Skillman, both of N.J.; Chi Ming L. Hsu, Ossining, N.Y.

[73] Assignee: General Foods Corporation, White Plains, N.Y.

[21] Appl. No.: 326,889

[22] Filed: Dec. 2, 1981

[51] Int. Cl.$^4$ .............................................. A21D 13/00
[52] U.S. Cl. ..................... 426/549; 426/19; 426/62; 426/622
[58] Field of Search ............... 426/19, 62, 549, 622, 426/243, 554

[56] References Cited

U.S. PATENT DOCUMENTS

| 4,271,203 | 6/1981 | Schiffmann | 426/243 |
| 4,374,151 | 2/1983 | Lindstrom | 426/19 |
| 4,406,911 | 9/1983 | Larson et al. | 426/19 |

FOREIGN PATENT DOCUMENTS 2481072 10/1981 France .
1032750  3/1976 Japan .

OTHER PUBLICATIONS

Journal of Japanese Society of Food and Nutrition, vol. 27, No. 4, pp. 153 and 154 (1974) (with translation).
Agriculture Handbook, No. 456, USDA, Nov. 1975, pp. 171–172.
Baking Science & Technology, E. J. Pyler, vol. 1, pp. 286–293 & 309.
D. F. Fuhrmann at *Proc. Ann. Meet. Amer. Soc. Bakery Eng.*, 54th (1978), pp. 90–95.
W. E. Boyd at *Proc. Ann. Meet. Amer. Soc. Bakery Eng.*, 56th (1980), pp. 38–43.

*Primary Examiner*—Donald E. Czaja
*Assistant Examiner*—Evan Federman
*Attorney, Agent, or Firm*—T. R. Savoie; D. J. Donovan

[57] ABSTRACT

A leavened and unleavened frozen dough composition is prepared comprising wheat protein in an amount greater than 16% protein based on the total weight of flour. The frozen dough can withstand less than ideal commercial distribution temperatures and storage in home freezers for more than 16 weeks with good baked, end-product results. A preferred embodiment is a yeast-leavened dough which is proofed before freezing to minimize consumer preparation time from freezer to point of consumption. The proofed, frozen dough maintains a commercially satisfactory quality after more than 16 weeks frozen storage.

10 Claims, No Drawings

FROZEN DOUGH HAVING IMPROVED FROZEN STORAGE SHELF LIFE

TECHNICAL FIELD

The present invention relates to frozen dough products and their preparation; and particularly, to improvements which provide products of this type characterized by prolonged frozen storage stabilities suitable for commercial distribution.

A wide variety of frozen dough products are known and have been available to the consumer in the form of bread items, namely white, wheat, raisin, and French- or Italian-type breads, a few basic dinner- or soft-roll-type items, puff dough items, and a variety of frozen cookies. Institutional frozen dough products available to in-store bake-off operations, retail bakers, cafeterias, and other feeding programs encompass a wider variety of frozen dough products, such as hard rolls, Kaiser rolls, hamburger rolls, frankfurter rolls, and other speciality rolls, rolled-in products such as Danish or puff pastry in either a pre-form or bulk or slab form, sweet yeast-raised dough items, such as cinnamon rolls, coffee cakes or other plain or filled sweet dough varieties, yeast-raised dough for fried products such as yeast-raised donuts or other fried items in various shapes or forms. The shelf life of frozen dough products will vary according to the formulation and the size of the item, some formulations have a little longer freezer life than others. Larger units will remain stable for longer periods than smaller units.

All products however are affected by freeze/thaw cycles of temperatures surrounding the product which can occur during transportation, distribution and handling at the final processing or bake-off level. It is desirable to keep the core temperature of frozen doughs in the range of $-26.0°$ C. to $-29°$ C. ($-15°$ to $-20°$ F.) to retain product stability. Unfortunately, frozen dough products available heretofore have a frozen storage shelf-life that is of insufficient duration even when the core temperature is kept at $-29°$ C. ($-20°$ F.) so as to render the dough unsuitable for numerous commercial applications. For normal distribution purposes, the frozen dough should withstand freeze/thaw cycles of temperatures around the product during marketing and distribution and the variety of home freezer storage temperatures used by consumers until prepared for consumption.

Various techniques for increasing the frozen storage shelf life of dough products are known. Heretofore, the objective of many researchers in the baking industry has been the retention of sufficient yeast viability and gassing power during frozen storage of yeast-containing doughs. The most commonly used technique for increasing frozen storage shelf-life of yeast-leavened frozen doughs has been to achieve yeast stability by preparing and freezing the dough with little or no fermentation before freezing.

James W. Pence in Chapter 7 of *Quality and Stability of Frozen Foods*, edited by W. B. VanArsdel et al, Wiley-Interscience, New York (1969) at pages 188–189 teaches that the yeast cells in unfermented frozen doughs are more cold-resistant than those in fermented doughs; therefore, most doughs are frozen with little or no fermentation.

The American Institute of Baking, Bulletin No. 108 (1964), teaches that doughs are frozen immediately after molding with little or no fermentation.

Schremmer, in U.S. Pat. No. 3,375,117, teaches that a frozen dough, chemically-leavened or yeast-leavened, of prolonged storability is produced when flour and dough-forming ingredients are cooled and mixed at a temperature below about 0° C.

Matz et al, in U.S. Pat. No. 3,166,425, teaches that the stability of chemically-leavened refrigerated doughs can be improved by proofing at temperatures of about 15.5° C. to 23.8° C. (60° to 75° F.), cooling the dough for a time sufficient to bring the dough to its freezing point, and, thereafter, storing the dough at refrigeration temperatures above 0° C. (32° F.).

Ono et al, in U.S. Pat. No. 3,894,155, teaches the preparation of a frozen dough having improved storage stability wherein the fermentation activity of the yeast is suppressed by two-stage addition of yeast. The second-stage addition of yeast is done under cooled conditions (a temperature of 2° to 15° C.), immediately followed by mixing the dough thus formed and freezing it without further fermentation.

P. E. Marstan in *Bakers Digest* 52 (5): 18–20, 37 (October 1978) teaches that dough destined for freezing should be developed in a mixer, have minimum yeast activity and gas generation before freezing.

Changes in formulation have been recommended to increase frozen storage shelf life: an increase in yeast level to 4 or 5%, an increase in shortening to 5%, and a slight decrease in water absorption (K. Lorenz, *Bakers Digest* 48 (2): 14–30 (1974); James W. Pence in *Quality And Stability Of Frozen Foods*, supra).

Dough conditioners and added vital wheat gluten at the 2% level have been incorporated into frozen doughs to improve dough strength. Taguchi et al, in U.S. Pat. No. 3,901,975, discusses the use of alpha-amino acids, either alone or in combination with a bromic acid salt, to prevent the reduction in yeast activity during the freezing and thawing of the dough for the purpose of prolonging yeast viability and gassing power in frozen bread.

W. E. Boyd at *Proc. Ann. Meet Amer. Soc. Bakery Eng.* 56th (1980) at pp. 38–43 describes the use of unbleached spring wheat flour in a frozen dough for white bread having a protein level of approximately 13% and dough conditioners, namely, potassium bromate, sodium stearoyl-2-lactylate and ascorbic acid. Boyd also teaches that vital wheat gluten is added at the 2% level in order to improve the dough strength of rye, wheat and raisin breads.

D. F. Fuhrmann at *Proc. Ann. Meet Amer. Soc. Bakery Eng.* 54th (1978) suggested that flour with a higher protein level, 12.50 to 13.50 percent, gives better dough tolerance and better product stability for freezing and handling of dough which is not proofed before freezing at the bake-off or retail level.

It has also been suggested that frozen dough stability is improved if the freezing temperature is lower than the storage temperature of the dough.

K. H. Hsu et al. in *Cereal Chemistry* 56 (5) 424–426 (1979) teach that in general, frozen doughs were less stable if their storage temperature was lower than their freezing temperature. Thawing or partial thawing followed by refreezing was also harmful to frozen dough stability.

J. L. Vetter in *Cereal Foods World* 24 (2) 42–43 (February 1979) stresses the need for additional research on freezing rates in dough systems in order to optimize processing and maximize shelf life. A shelf life of one year was expected if doughs were processed within 10-15 minutes after mixing by freezing at −32° C. (−25° F.) and storing below −12° C. (+10° F.).

The baking industry is still seeking to maximize frozen storage shelf life of frozen doughs. The variety of approaches offered for the purpose is, to some extent evidence that none is without disadvantage. Some of the techniques identified by the prior art may be effective in prolonging frozen storage shelf life, but product improvements are still needed. The frozen dough industry has spent much effort education supermarket managers and consumers on correct storage temperatures and correct preparation procedures, has improved quality by dating of the products, has increased advertising and promotional programs, and has made improvements in merchandising techniques. The consumer, however, still finds it quite frustrating at times trying to prepare a fresh "home-baked" loaf of bread from frozen dough which does not rise in the pan after thawing, even though all of the instructions on the package have been carried out correctly. Thus, it is still desirable to find a means for prolonging the frozen storage shelf life of frozen doughs while maximizing consumer convenience, insuring greater uniformity in product quality, minimizing sensitivity to less than ideal freezer storage temperatures, with consistently good end results whether baked at home or by retail bakers.

DISCLOSURE OF INVENTION

The novel frozen dough composition of this invention includes wheat protein content in an amount greater than 16% protein based on the total weight of flour, in addition to the necessary dough ingredients such as flour and water. Other ingredients common in the art which are used in making dough may include sugar, salt, shortening, non-fat dry milk, a leavening agent, emulsifiers or the like. These ingredients when processed by the methods described herein, interact in an unexpected way, enabling the frozen dough to withstand less than ideal commercial distribution temperatures and storage in home freezers for prolonged periods of time, e.g. more than 16 weeks, with good end product results. The dough composition may be unleavened, yeast-leavened, or chemically leavened. One of the objects of this invention is to improve the frozen storage stability of any dough composition so that when made according to the present method it is capable of sustaining prolonged periods of freezing and is able to produce a good quality baked product after frozen storage.

A preferred embodiment of this invention is a yeast leavened dough which can be proofed before freezing and held for baking at a later time which will maintain quality during normal commercial frozen storage temperature ranges for at least 16 weeks, and can be conveniently prepared from the freezer to a finished bake loaf having good loaf volume and oven spring within about 1 hour. This frozen dough which is proofed before freezing eliminates the usual thawing and proofing step, which usually requires 2-12 hours for the thawing and 2-4 hours for the proofing, before the dough is placed in the oven for baking.

The dough composition prepared according to the present invention can comprise all of the usual dry ingredients, shortenings, and leavening agents, as desired, in amounts traditionally employed in the baking industry. A radical departure from the usual dough ingredients involves the use of more than 16% wheat protein, preferably from 17-28% wheat protein, based on the total flour content.

It is noted that total protein in the dough compositions contemplated can include minor amounts of protein from such sources as egg albumen, nonfat dry milk, whey and soy, but for the purposes of calculating protein content for this invention, the calculations are limited to wheat protein in major amounts of more than 16% flour basis.

A suitable source for the wheat protein content can be a naturally occurring high protein wheat flour having from 17-24% protein as measured by standard American Association of Cereal Chemists (AACC) methods. For example, a wheat flour derived from a hard red winter wheat having the following specifications:

| Specification | Limit | Analytical Method |
|---|---|---|
| Moisture | 14% maximum | AACC |
| Foreign Material | None | AACC |
| Flavor | None | Organoleptic |
| Odor | None | Organoleptic |
| Protein (Flour) (N × 5.7 M.B.) | 18% minimum | AACC |
| ASH | 0.42-0.48 | AACC |
| Crude Fiber | — | AACC |
| Farinograph | | |
| Water Absorption | 67 ± 1% | AACC |
| Stability | 17-24 min | AACC |
| Peak Time | 20-25 min | AACC |
| Mixing Tolerance Index | 10-20 BU | AACC | may be employed.

Another source of wheat protein for the frozen dough of this invention could comprise a combination of a commercially available flour having 12-15% protein content and a supplemental amount of protein concentrates selected from the group consisting of air-fractionated wheat flour and vital wheat gluten and other glutinous sources to increase the total protein content on a flour basis, from 12-15% to a level greater than 16%. Additional protein has been found to have a cumulative effect, thus a 16% protein level yields an improved product over a 15% level, 17% is improved over 16% and so on. The exact protein level employed will be, in part, determined by economic considerations, since as will be recognized by those skilled in the art, increased protein levels will increase costs.

In addition to increased storage stability, another advantage that results from using wheat protein for this invention is that the wheat proteins have an advantageous effect on the organoleptic qualities of the baked product. Y. Pomeranz in *Cereal Foods World*, 25 (10) 656-662 (1980) teaches that the higher protein levels in a non-frozen dough contribute to a higher loaf volume. However, no one suggests that higher protein levels in frozen dough would lead to significant increases in frozen storage shelf life.

As employed throughout this disclosure, the term "dough" is meant to include a mixture of flour and other ingredients stiff enough to knead or roll. "Fermentation" is meant to include all changes in the dough brought about by the action of yeast enzymes or chemical agents which function to aerate a dough and develop the gluten. Total fermentation time includes the time elapsed during fermentation of the dough in bulk, resting or benching, and proofing. For the sake of clarity, traditional baking terminology is defined below and employed when appropriate to identify the specific dough treatment steps and/or dough ingredients.

"Fermentation in bulk" occurs after the dough formulation is mixed and allowed to stand before it is divided into separate portions. "Resting" is used interchangeably with "benching" to denote periods of time allowed to give the gluten of the flour time to recover from any step such as dividing, moulding, forming, etc., wherein the dough has been stretched or worked. Without these rest periods, the dough is usually sticky and difficult to handle.

"Proofing" is the final step before baking or freezing wherein the time is allowed for the yeast or chemical leavening agents to produce more gas to give the correct volume and vesiculation to the moulded or shaped dough portion. This proofing step also includes "panning", which is defined as placing shaped dough in pans.

A "leavening agent" is a compound or mixture of chemical compounds which produces carbon dioxide gas that functions to aerate baked products. Thus, in yeasted bread, yeast is a leavening agent; in certain types of cookies, ammonium bicarbonate is a leavening agent; and in cakes, baking powder is a leavening agent. Baking powder is a mixture of chemical compounds, including sodium bicarbonate, which dissolves in water and reacts with an acid material to produce carbon dioxide.

The term "baked product" includes, but is not limited to, rolls, bread, biscuits, sweet doughs, pizza crust, plain or filled doughs, puff pastry, and the like.

On a flour basis, the moisture content of any of the doughs of this invention will range between 50 and 95% and, more typically, between 70 and 95%. If the dough contains moisture greater than the amount specified above, it will become difficult to handle. If the moisture content is too low, the dough becomes so stiff and non-extensible that the proper oven spring and rise do not occur.

DESCRIPTION OF PREFERRED EMBODIMENT OF INVENTION

The present invention is now particularly described with respect to the preparation of a yeast-leavened frozen dough which is proofed before freezing, but it should be apparent to those skilled in the art that the teachings herein have other applications; for instance to the preparation of unleavened doughs, chemically leavened doughs, yeast leavened doughs which are not proofed before freezing, and the like.

According to the preferred embodiment, the ingredients are mixed under ambient conditions which are usually lower than normal fermentation temperatures of about 30° C. Optimally, the fermentation temperature is in a range between 20° C. and 30° C. so as to obtain a slow and controlled rate of fermentation. If temperatures above 30° C. are utilized, the dough structure is likely to expand too much and weaken. Those skilled in the art will readily appreciate that fermentation occurs as a function of time and temperature. In the present dough formulation, total fermentation time, before freezing, is usually for from 1.0 to 3.0 hours. Fermentation of the yeast-containing dough of this invention occurs at separate intervals of time; first in bulk and subsequently with the dough in divided portions. The fermentation periods comprise one or more short intervals of at least five minutes duration with the dough in bulk or in divided portions and one longer interval of about 45 minutes duration; however, the total fermentation time does not exceed two hours. Fermentation times and temperatures are limited to control the volume of the dough as discussed in further detail infra. It is also important to have the proper dough rheological characteristics to obtain a high quality bread. Because the chemical leavening agents, yeast, yeast by-products and flour enzymes are important factors in obtaining the proper rheology, fermentation time must be controlled. However, those skilled in the art will also appreciate that different types of strains of yeast and different chemical leavening agents will dictate different times and temperatures to be used in fermentation.

After fermentation in bulk has taken place, conventional steps are employed in forming the dough into bread loaf configurations. Those skilled in the art will recognize that these steps usually consist of dividing, rounding, benching, molding and panning of the bread dough.

At this point in the process, the formed yeast-containing dough is allowed to proof for a period of time to rise to a given height. The proofing period allows the dough to generate additional carbon dioxide so that when it goes into an oven it will spring up. This proofing period is essential because the loss of carbon dioxide which occurs during dividing and formation must be regenerated. During this period, the gluten relaxes and the dough piece conforms to the shape of the container. The overall objective of the final proofing period is to allow each formed dough to attain a specific volume of between 1.33 to 3.08 cc/g dough, preferably 1.98 to 2.86 cc/g dough, before freezing.

The volume of the fermented dough, before freezing, has a direct correlation to the volume of the finished baked loaf which has been taken directly from the freezer and baked. The difference between the size of the frozen dough portion after frozen storage and the maximum size of the baked product attained in the oven is called "oven spring". Oven spring can be positive or negative. When the fermented dough prior to freezing has a specific volume of from 1.0 to 2.64 cc/g, a positive and increasing oven spring results. When the fermented dough is greater than 2.64 cc/g, a positive but decreasing oven spring results. When the specific volume before freezing exceeds 3.08 cc/g, negative oven spring results, i.e, the bread does not rise in the oven. Thus, after forming each portion of fermented dough and proofing to allow additional fermentation before freezing, the proofing time should be sufficient for each portion of dough to attain a specific volume of from about 1.33 to about 3.08 cc/g to obtain a desirable baked product which rises in the oven.

If the fermentation period is very long in time, the dough probably expands too much and weakens the dough structure. Another problem with extended fermentation periods is that the surface of the dough will be subject to an evaporation or dessication phenomenon. Consequently, a thin surface layer would form on the dough body which has a lower water content than the body of dough underneath the surface layer. This surface layer forms a coherent skin covering the dough body which in turn produces textural and color abberations not desired in a final baked product. One method to retain the desired moisture content and prevent dessication of the dough is to package the dough immediately after the final proofing period. Another method is to package the dough immediately before the final proofing period and allow such period to occur while the dough is in the package. If one proceeded by the latter method, more energy would be required to freeze the dough within the package.

Any of the doughs of this invention should be frozen such that the core temperature of it reaches −1.0° C. to −25.0° C. and, more preferably, −6.0° C. to −25.0° C. within 1 to 6 hours and, more preferably between 1½ and 4 hours. When freezing the dough, a uniform cooling rate throughout the dough is desirable. The frozen dough is typically stored at a temperature within the range of −30.0° C. to −10.0° C.

During the baking process, the dough expands to give a normal loaf volume. The expansion can be 1½ times its original volume. This physical occurrence provides a sense of baking from "scratch" rather than just rewarming a previously baked product. This sense of accomplishment is further enhanced by the fresh-baked aroma of leavened bread which is given off.

The present invention is further illustrated, but in no way limited by the following examples.

EXAMPLE 1

Yeast-Leavened Frozen Dough Proofed Before Freezing, 24% Protein

| Ingredient | % Flour Basis |
| --- | --- |
| Enriched bread flour, 14% protein | 100.00 |
| Vital wheat gluten | 17.86 |
| Nonfat dry milk | 2.00 |
| Sugar | 6.00 |
| Sodium chloride | 2.00 |
| Activated dry yeast | .50 |
| Yeast food | .50 |
| Hydrocolloid gum | .07 |
| Liquid shortening | 5.50 |
| Emulsfier; diacetyl tartaric acid, ester of monoglyceride (DATA) | .50 |
| α monoglycerides | .35 |
| Water | 81.86 |
| L-cysteine | 60 ppm |
| Potassium bromate | 70 ppm |
| Ascorbic acid | 160 ppm |

Mix together hydrocolloid gum (7 g.) and quantity (50 g.) of sugar to facilitate dispersion of gum in water. Slowly add gum and sugar mixture to tap water (1600 g.) while mixing with an electric mixer. After thoroughly mixing the gum, sugar and water, the mixture is allowed to stand while preparing separate aqueous solutions of three dough conditioners; L-cysteine, potassium bromate and ascorbic acid in separate concentrations each having 5 grams of conditioner per liter of water. Next, in a separate container, the emulsifier (DATA) 50 g., is mixed with the liquid shortening (550 g.) by stirring.

The remaining dry ingredients, except for the activated dry yeast, are placed in a container and mixed with an electric mixer at speed 1 for ten minutes.

To the mixed dry ingredients are added the emulsifier/shortening mixture; gum/sugar/water mixture; 60 ppm of L-cysteine solution; 160 ppm ascorbic acid solution and the remainder of the water not used in preparing the gum/sugar/water mixture and aqueous solutions of dough conditioners. The dry ingredients and all additions specified above are mixed with an electric mixer for less than one minute. Next, 70 ppm of the potassium bromate solution is added to the previously mixed ingredients; then the entire mixture is mixed with an electric mixer, at speed 1, for three minutes. The activated dry yeast is slowly added over a one-minute interval during this mixing step.

The yeast-containing mixture is then mixed at speed 2 for twenty five minutes to achieve optimum development of a bulk dough.

The dough is transferred to a trough and allowed to ferment for 15 minutes at 23° C. Thereafter, the dough is divided and rounded into 454±5 gram portions. After rounding, the dough is allowed to rest for 15 minutes in an intermediate proof step before moulding and panning. After panning, the dough is allowed to ferment for approximately 120 minutes at 80° F. and 85% relative humidity until each 454±5 gram dough piece attains a volume of approximately 1100 cubic centimeters (cc). The dough is then frozen for two hours at −35° C. packaged and moved to a −18° C. freezer for storage.

The baking performance of this dough after extended storage times at −18° C. is reported in Table II following Example 7 infra. All doughs described herein are taken from frozen storage, placed in a cold oven which is thermostatically controlled. The oven is immediately turned on and allowed to heat to a temperature of about 180° C. Each dough piece is baked for about 55 to 60 minutes. Other methods for preparing a finished baked loaf are contemplated. For example, baking in a preheated oven, microwave oven preparation, and the like can be used. This invention is not to be limited to a baking method or technique.

EXAMPLES 2-6

Yeast-Leavened Frozen Dough, Proofed Before Freezing

The ingredients for Examples 2-6 are as specified in Table I.

TABLE I

VARYING LEVELS OF PROTEIN

| Example No. | % Protein, Flour Basis | % Added Vital Wheat Gluten | % Water, Flour Basis |
| --- | --- | --- | --- |
| 2 | 14 | 0.00 | 64.00 |
| 3 | 18 | 6.45 | 67.23 |
| 4 | 20 | 10.00 | 69.00 |
| 5 | 22 | 13.79 | 70.90 |
| 6 | 24 | 17.86 | 72.93 |

In each of the above examples the remaining ingredients used are in the proportions stated below:

| Ingredient | % Flour Basis |
| --- | --- |
| Enriched bread flour, 14% protein | 100.00 |
| Liquid shortening | 6.00 |
| Emulsifier; diacetyl tartaric acid, ester of monoglyceride (DATA) | 0.50 |
| Activated dry yeast | 1.50 |
| Yeast food | 0.50 |
| Nonfat dry milk | 2.00 |
| Sugar | 6.00 |
| Sodium Chloride | 2.00 |
| Egg albumen | 0.50 |
| Hydrocolloid gum | 0.07 |
| Sodium Carrageenan | 0.10 |
| L-cysteine | 60 ppm |
| Potassium bromate | 70 ppm |
| Ascorbic acid | 120 ppm |

The ingredients are mixed, fermented, moulded, panned, proofed and then frozen in a procedure similar to that described in Example 1. Baking results after extended storage times at −18° C. are reported in Table II below.

EXAMPLE 7

Yeast-Leavened Frozen Dough, Proofed Before Freezing, Naturally Occurring High Protein Varietal Flour A dough is prepared according to the procedure described in Example 1, using the ingredients in the proportions specified, except that a naturally occurring varietal flour is substituted for the commercially available 14% protein bread flour and the vital wheat gluten. Thus, 100% of the flour in this Example is obtained from a varietal wheat having a measured protein content of 20% based on the total weight of the flour. After mixing, fermenting, moulding, panning, proofing and freezing, the dough is stored at −18° C. for the periods of time shown in Table II. Table II also shows baking results after removal of several dough portions from −18° C. storage. In Table II the dash (--) indicates, "not measured".

TABLE II

Proofed Loaf Volume Before Freezing ~1100CC
Storage at −18° C. (0° F.)

| Dough Portions from Ex. No. | % Protein (Flour Basis) | Storage Period (Days): | | | | |
|---|---|---|---|---|---|---|
| | | 1 | 20 | 40 | 60 | 112 |
| | | Approximate Volume of Baked Bread (cc) | | | | |
| 1 | 24 | 2025 | 1975 | 1950 | 1910 | 1850 |
| 2 | 14 | 1900 | 1600 | 1300 | 1300 | 1250 |
| 3 | 18 | 2000 | 1650 | 1470 | 1380 | 1250 |
| 4 | 20 | 2000 | 1900 | 1850 | 1760 | 1500 |
| 5 | 22 | 2200 | 1900 | 1900 | 1900 | 1700 |
| 6 | 24 | 2300 | 2200 | 2000 | 2050 | — |
| 7 | 20 | 2010 | 2000 | 2000 | 1700 | — |

The surprising and unexpected results which are the essence of this invention are shown in the positive correlation between protein content and the prolonged frozen storage shelf-life of frozen dough which has been proofed before freezing. As protein content increases from 14 to 24% the ability to achieve an excellent loaf volume, after frozen storage and upon baking, is significantly improved. Instead of a 600 cc decrease in baked loaf volume after 60 days frozen storage of a loaf containing 14% protein, the decrease in baked loaf volume over the same period of time is 300 cc or less in a loaf containing 20-24% protein, flour basis. Experience shows that even after extended frozen storage for over 100 days, a baked loaf volume which is commercially acceptable and desirable is easily produced.

Except for Example 1, the above table also shows a positive correlation between protein content and loaf volume. The higher the protein content, the higher the initial loaf volume of bread baked after 1 day of frozen storage.

EXAMPLE 8

Yeast-Leavened Frozen Dough, Not Proofed Before Freezing—24% Protein

A dough is prepared according to the procedure described in Example 1, using the ingredients in the proportions specified, except that after the dough is moulded and panned, the proofing step at 27° C. and 85% relative humidity is omitted. The dough is packaged and frozen immediately after panning; the freezing conditions are as reported in Example 1. Storage at −18° C. for specific time periods with the corresponding baking results are reported in Table III.

TABLE III

| | Non-Proofed Frozen Dough | | |
|---|---|---|---|
| | Storage Period (Days): | | |
| Storage at −18° C. | 1 | 7 | 21 |
| Frozen Dough Volume (cc) | 375 | 500 | 550 |
| Baked Loaf Volume (cc) | 1225 | 1550 | 1300 |

The data in Table III show the dough of this invention is also suitable for use as a non-proofed frozen freezer-stored dough that can be taken directly from the freezer, placed in a cold oven that is immediately turned on using a thermostatic control set at about 180° C., and upon baking gives a 2 to 3 fold increase in loaf volume.

EXAMPLE 9

Chemically-Leavened Frozen Dough—24% Protein

A dough is prepared according to the procedure described in Example 1, using the ingredients in the proportions specified, except that 4.69% sodium aluminum phosphate on a flour basis (375 g) and 4.69% sodium bicarbonate on a flour basis (375 g) are substituted for the activated dry yeast. The fermenting and proofing steps described in Example 1 are also omitted. The dough is packaged and frozen immediately after panning; the freezing conditions are as reported in Example 1. Storage at −18° C. for specific time periods with the corresponding baking results are reported in Table IV.

TABLE IV

| | Chemically-Leavened Frozen Dough | | |
|---|---|---|---|
| | Storage Period (Days): | | |
| Storage at −18° C. | 1 | 7 | 21 |
| Frozen Dough Volume (cc) | 375 | 475 | 525 |
| Baked Loaf Volume (cc) | 875 | 1000 | 975 |

Table IV shows that a non-proofed, chemically-leavened dough of this invention can be stored in a freezer and when baked within three weeks gives a baked loaf which has a volume that is about 2 times the original volume of the frozen dough portion.

EXAMPLE 10

Unleavened Frozen Dough—24% Protein

A dough is prepared according to the procedure described in Example 1, using the ingredients in the proportions specified, except that activated dry yeast and yeast food are omitted. The fermenting and proofing steps described in Example 1 are also omitted. The dough is packaged and frozen immediately after panning; the freezing conditions are as reported in Example 1. Storage at −18° C. for specific time periods with the corresponding baking results are reported in Table V. The frozen dough volume is measured just prior to baking.

TABLE V

| | Unleavened Frozen Dough | | |
|---|---|---|---|
| | Storage Period (Days): | | |
| Storage at 0° F. | 1 | 7 | 21 |
| Frozen Dough Volume (cc) | 325 | 475 | 500 |

TABLE V-continued

| | Unleavened Frozen Dough | | |
|---|---|---|---|
| | Storage Period (Days): | | |
| Storage at 0° F. | 1 | 7 | 21 |
| Baked Loaf Volume (cc) | 700 | 650 | 625 |

Table V shows that about 1.2 to 2 fold increase in loaf volume is achieved when baking a totally unleavened frozen dough. It is believed that this expansion results from the incorporation of air in the dough during the mechanical mixing steps. This incorporated air is retained in the dough during freezing by the integrity of the gluten film around each air cell and the air cells expand on heating until the protein film is heat set at a temperature of about 71° C. (160° F). The integrity of the gluten film is believed to be a function of the increased protein content in the dough.

EXAMPLE 11

Bran Bread—25% Flour Protein; Proofed Before Freezing

The following ingredients are mixed, fermented, moulded, panned, proofed and then frozen in a procedure similar to that described in Example 1. The baking performance of this dough after extended storage times at −18° C. is reported in Table VI following Example 13 infra.

| Ingredient | % Flour Basis |
|---|---|
| Enriched bread flour, 14% protein | 60.0 |
| Whole wheat flour | 40.0 |
| Vital wheat gluten | 20.0 |
| Bran | 10.0 |
| Dark brown sugar | 3.0 |
| Light molasses | 3.0 |
| White sugar | 4.0 |
| Sodium chloride | 2.0 |
| Activated dry yeast | 0.5 |
| Liquid shortening | 4.0 |
| Emulsifier, diacetyl tartaric acid, ester of monoglyceride (DATA) | .50 |
| α monoglycerides | 0.50 |
| Hydrocolloid gum | 0.07 |
| Water | 88.35 |
| L-cysteine | 60 ppm |
| Potassium bromate | 70 ppm |
| Ascorbic acid | 160 ppm |

EXAMPLE 12

Wheat Bread, 25% Flour Protein; Proofed Before Freezing

The ingredients and processing procedure in Example 11 are used to prepare a wheat bread with the addition of a pre-cooked wheat and different quantities of bran and water as indicated below:

| | % Flour Basis |
|---|---|
| Bran, wheat | 2.50 |
| Water | 93.00 |
| Pre-cooked wheat, dry | 3.00 |

Baking results after storage at −18° C. is reported in Table VI following Example 13 infra.

EXAMPLE 13

French/Italian Bread, 20% Flour Protein: Proofed Before Freezing

This lean formula dough consisting of the ingredients listed below is prepared using the procedure described in Example 1. The baking performance after storage at −18° C. is reported in Table VI below:

| Ingredients | % Flour Basis |
|---|---|
| Enriched bread flour, 14% protein | 100.00 |
| Vital wheat gluten | 10.00 |
| White sugar | 2.50 |
| Sodium chloride | 2.00 |
| Activated dry yeast | 0.50 |
| Liquid shortening | 2.00 |
| Emulsifier; diacetyl tartaric acid, ester of monoglyceride (DATA) | 0.50 |
| Hydrocolloid gum | 0.07 |
| Water | 73.00 |
| L-cysteine | 60 ppm |
| Potassium bromate | 70 ppm |
| Ascorbic acid | 160 ppm |

TABLE VI

Storage at −18° C.
Proofed Dough Volume Before Freezing ~1100CC

| | Storage Period (Days): | | | | | |
|---|---|---|---|---|---|---|
| Dough Portions from Ex. No. | 1 | 14 | 21 | 50 | 90 | 180 |
| | Volume of Baked Bread (CC) | | | | | |
| 11 (Bran) | 2125 | 2100 | 1825 | — | — | — |
| 12 (Wheat) | 2025 | 2000 | 2000 | 1860 | 1850 | 1600 |
| 13 (French/Italian) | 2140 | 2075 | 2000 | 1715 | 1650 | 1600 |

EXAMPLE 14

Effect of Vital Wheat Gluten Addition on Baked Volume of Frozen Dough

A model dough system containing a fixed amount of cottonseed oil and water and varying amounts of starch and gluten is prepared, frozen overnight and baked. Another dough system containing 100% wheat flour, cottonseed oil and water is prepared, frozen and baked for comparison purposes.

The following procedure is used in mixing and handling each dough sample. Cottonseed oil (4.5 grams) and water (70 grams) are added to 100 grams of flour or a starch/gluten mixture, in the amounts specified in Table VII below. The dough ingredients are mixed in an electric blender for three minutes at speed 1 and five minutes at speed 3. After resting for 1.5 hours at room temperature (~23° C.), the samples are put into a freezer at −18° C. for about 18 hours. The frozen dough is removed from the freezer, placed in a cold oven that is immediately turned on and heated to a temperature of about 180° C. The dough is baked for about 40 minutes, allowed to cool and then measured to determine the baked loaf volume. Each dough sample weighs approximately 87 grams before freezing and has a loaf volume of approximately 90 cc when taken from the freezer and placed in the oven for baking.

The baking results are shown below for each of the samples.

TABLE VII

| SAMPLE NO. | STARCH/GLUTEN (GRAMS) | % PROTEIN (FLOUR BASIS) | BAKED VOLUME (CC) |
|---|---|---|---|
| 1 | 100/0 | 0 | 100 |
| 2 | 90/10 | 8 | 100 |
| 3 | 80/20 | 16 | 110 |
| 4 | 70/30 | 24 | 140 |
| 5 | 50/50 | 40 | 375 |
| 6 | 30/70 | 56 | 305 |
| 7 | 0/100 | 80 | 265 |
| *A | Wheat flour | 14 | 125 |

*For purposes of comparison, not an example of this invention.

The above data show that in an unleavened frozen dough system there is a direct correlation between protein content and baked volume of the dough up to a 50 percent level of vital wheat gluten addition; the higher the protein content, the higher the baked volume of the sample. Even a 100% gluten frozen dough system gives a baked volume that is 2.6 times that of a dough system having 100% starch content and at least 2 times the baked volume of a dough system made from a commercially available wheat flour (sample A).

The data in Table VII also suggests that vital wheat gluten acts as a non-biological leavening agent in a frozen dough system. A puffed, aerated baked dough structure without a leavening agent could be employed in meat analogs to contribute a hard, chewy texture.

EXAMPLE 15

Frozen Storage Stability of Yeast Containing Dough Systems With and Without Gluten Addition In a manner similar to that described in Example 14, the following yeast-containing dough systems were prepared, proofed, frozen and stored for up to four weeks, with bake-offs at the intervals shown in Table VIII below.

Dough No. 1 contains 500 g. wheat flour (14%) protein, flour basis), 31.25 g. cottonseed oil, 328 g. water with 2.5 g. activated dry yeast dissolved with 1 g. sugar and 10 g. water.

Dough No. 2 contains 80% wheat flour (14% protein, flour basis), 20% vital wheat gluten in addition to the other non-flour ingredients used in Dough No. 1, supra.

Aliquots of each dough sample are prepared weighing approximately 86 grams and having a proofed, frozen dough volume of about 130 cc.

TABLE VIII

| | STORAGE AT −18° C. | | | | |
|---|---|---|---|---|---|
| | | Storage Time (days): | | | |
| | % Protein (Flour Basis) | 1 | 7 | 14 | 28 |
| | | Baked Loaf Volume (cc) | | | |
| *Dough #1 | 14 | 260 | 260 | 220 | 180 |
| Dough #2 | 28 | 330 | 300 | 260 | 220 |

*For comparison purposes, not an example of this invention.

The data in Table VIII show a decreasing baked loaf volume for each proofed dough piece as frozen storage time increases; however when comparing Dough No. 1 with Dough No. 2, the dough with the higher protein content gives a consistently higher baked loaf volume suggesting that after prolonged frozen storage, a proofed yeast-containing dough could continue to deliver a commercially acceptable loaf volume with the judicious addition of vital wheat gluten.

The above description is for the purpose of teaching the person skilled in the art how to practice the present invention. This description is not intended to detail all of the obvious modifications and variations of the invention, e.g., various leavening agents, use of preservatives, quantity of dough prepared, etc., which will become apparent to the skilled worker upon reading. However, applicant does intend to include all such obvious modifications and variations within the scope of his invention which are defined by the following claims.

We claim:

1. A yeast-leavened frozen dough suitable for commercial distribution said dough having improved frozen storage stability; said dough containing a yeast leavening agent and more than 16% wheat protein based on the total flour content and said dough having been proofed before being frozen.

2. The frozen dough of claim 1 wherein the wheat protein is derived from a naturally occurring high protein varietal wheat.

3. The frozen dough of claim 1 wherein the wheat protein comprises a commercially available flour having 12-15% protein content and a supplemental amount of a wheat protein concentrate selected from the group consisting of air-fractionated wheat flour and vital wheat gluten to increase the total protein content on a flour basis from 12-15% to more than 16%.

4. The frozen dough of claim 1, 2 or 3 wherein the wheat protein is in a range of from about 17-28% based on the total flour content.

5. The proofed frozen dough of claim 4 which is proofed for a time sufficient for each portion of dough to attain a specific volume of from about 1.33 cubic centimeters per gram to about 3.08 cubic centimeters per gram.

6. The method of preparing the frozen dough of claim 4 comprising the steps of
    (a) preparing the yeast-containing dough under ambient temperature;
    (b) fermenting the resultant dough for at least 5 minutes at about 20° C. to 30° C.,
    (c) dividing the fermented dough into separate portions of dough;
    (d) forming each portion of fermented dough and proofing to allow additional fermentation, the proofing time being sufficient for each portion of dough to attain a specific volume of from about 1.76 cubic centimeters per gram to about 3.08 cubic centimeters per gram; and,
    (e) freezing each portion of the dough of step (d) such that the core temperature reaches −1.0° C. to −25.0° C. within 1 to 6 hours.

7. The method of claim 6 wherein the frozen dough of step (e) is removed from the freezer and, without an intervening proofing step, baked within about one hour's time after removal from the freezer.

8. The method of claim 7 wherein the frozen dough of step (e) is placed in a thermostatically-controlled oven and baked at a temperature of about 175° C.

9. The method of claim 7 wherein the frozen dough of step (e) is baken in a microwave oven.

10. The frozen dough of claim 2 wherein the naturally occurring high protein varietal wheat has at least 18% protein based on total flour content.

* * * * *